US011562574B2

(12) United States Patent
Pitale

(10) Patent No.: US 11,562,574 B2
(45) Date of Patent: Jan. 24, 2023

(54) METHOD FOR LEARNING A VEHICLE BEHAVIOR OF A MONITORED AUTOMOBILE AND A RESPECTIVE AUTOMOBILE

(71) Applicant: Bayerische Motoren Werke Aktiengesellschaft, Munich (DE)

(72) Inventor: Mandar Pitale, Neu-Ulm (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1029 days.

(21) Appl. No.: 16/264,964

(22) Filed: Feb. 1, 2019

(65) Prior Publication Data
US 2019/0163996 A1 May 30, 2019

Related U.S. Application Data

(63) Continuation of application No. PCT/EP2017/069132, filed on Jul. 28, 2017.

(30) Foreign Application Priority Data

Aug. 2, 2016 (WO) .................. PCT/EP2016/068427

(51) Int. Cl.
*G06V 20/58* (2022.01)
*G06K 9/62* (2022.01)
(Continued)

(52) U.S. Cl.
CPC .............. *G06V 20/584* (2022.01); *B60Q 1/46* (2013.01); *B60Q 1/50* (2013.01); *G06K 9/6201* (2013.01);
(Continued)

(58) Field of Classification Search
CPC .......... G06V 20/584; B60Q 1/46; B60Q 1/50; G06K 9/6201; G08G 1/0112;
(Continued)

(56) References Cited

U.S. PATENT DOCUMENTS 4,996,719 A * 2/1991 Okazaki ............. H04B 10/1143
398/187
6,100,799 A * 8/2000 Fenk ...................... B60Q 1/444
362/519

(Continued)

FOREIGN PATENT DOCUMENTS

FR 2893171 A1 * 5/2007 ............. G08G 1/161
JP 2016-9251 A 1/2016

OTHER PUBLICATIONS

Extended European Search Report issued in European Application No. 17 751 320.7 dated Aug. 5, 2020 (seven (7) pages).
(Continued)

Primary Examiner — Dale W Hilgendorf
(74) Attorney, Agent, or Firm — Crowell & Moring LLP

(57) ABSTRACT

A vehicle behavior of a monitored vehicle is learned. A vehicle illumination of the monitored vehicle is detected and monitored. If a light-pattern occurs in the detected vehicle illumination, wherein the light-pattern corresponds to a frequency, intensity and/or color dependent glowing of the vehicle illumination, and further wherein the light-pattern starts with a flashing up of the detected vehicle illumination and ends after a certain time without glowing of the respective part of the detected vehicle illumination, then the method further monitors the light-pattern; monitors a vehicle movement of the monitored vehicle during the occurrence of the light-pattern; and compares the monitored light-pattern with a known light-pattern from a light-pattern data entry stored in an light-pattern database. If the comparison results in the monitored light-pattern being unknown, the method stores the light-pattern and the vehicle movement together as a new light-pattern data entry in the light-pattern database.

16 Claims, 7 Drawing Sheets

(51) Int. Cl.
*B60Q 1/50* (2006.01)
*G08G 1/01* (2006.01)
*B60Q 1/46* (2006.01)
*H04W 4/46* (2018.01)
*G01P 3/36* (2006.01)
*G01P 13/00* (2006.01)
*G01P 15/00* (2006.01)
*G05D 1/02* (2020.01)

(52) U.S. Cl.
CPC ......... *G08G 1/0112* (2013.01); *G08G 1/0129* (2013.01); *G08G 1/0133* (2013.01); *G01P 3/36* (2013.01); *G01P 13/00* (2013.01); *G01P 15/00* (2013.01); *G05D 1/0231* (2013.01); *G05D 1/0276* (2013.01); *H04W 4/46* (2018.02)

(58) Field of Classification Search
CPC ...... G08G 1/0129; G08G 1/0133; G01P 3/36; G01P 13/00; G01P 15/00; G05D 1/0231; G05D 1/0276; H04W 4/46
See application file for complete search history.

(56) References Cited

U.S. PATENT DOCUMENTS

| | | | | |
|---|---|---|---|---|
| 7,573,378 | B2* | 8/2009 | Matsumoto | B60Q 1/444 340/467 |
| 10,112,528 | B1* | 10/2018 | Mazuir | B60Q 1/444 |
| 2007/0242337 | A1* | 10/2007 | Bradley | G08G 1/161 340/5.1 |
| 2009/0278678 | A1* | 11/2009 | Krotkov | B60Q 1/444 340/467 |
| 2012/0044066 | A1* | 2/2012 | Mauderer | B60T 7/22 340/479 |
| 2014/0368324 | A1* | 12/2014 | Seifert | G08G 1/166 340/435 |
| 2015/0123781 | A1* | 5/2015 | Mauderer | B60T 7/22 340/479 |
| 2016/0229395 | A1* | 8/2016 | Schmüdderich | B60W 10/18 |
| 2017/0190286 | A1* | 7/2017 | Yavitz | B60Q 1/444 |
| 2019/0329769 | A1* | 10/2019 | Shalev-Shwartz | B60W 60/001 |

OTHER PUBLICATIONS

Feixang, R.; et al., "General Traffic Sign Recognition by Feature Matching", Image and Vision Computing New Zealand, 2009. 24th International Conference Image and Vision Computing New Zealand (IVCNZ 2009), Nov. 23, 2009, pp. 409-414, Piscataway, NJ, USA, XP031599986, ISBN: 978-1-4244-4697-1, (six (6) pages).
International Search Report (PCT/ISA/210) issued in PCT Application No. PCT/EP2017/069132 dated Oct. 26, 2017 (three pages).
Written Opinion (PCT/ISA/237) issued in PCT Application No. PCT/EP2017/069132 dated Oct. 26, 2017 (eight pages).
Japanese-language Office Action issued in Japanese Application No. 2019-505485 dated May 12, 2021 with partial English translation (four (4) pages).

* cited by examiner

METHOD FOR LEARNING A VEHICLE BEHAVIOR OF A MONITORED AUTOMOBILE AND A RESPECTIVE AUTOMOBILE

CROSS REFERENCE TO RELATED APPLICATIONS

This application is a continuation of PCT International Application No. PCT/EP2017/069132, filed Jul. 28, 2017, which claims priority under 35 U.S.C. § 119 from PCT International Application No. PCT/EP2016/068427, filed Aug. 2, 2016, the entire disclosures of which are herein expressly incorporated by reference.

BACKGROUND AND SUMMARY OF THE INVENTION

The present invention relates to the field of automobile monitoring.

Fully autonomous driven automobiles, highly automated driven automobiles as well as driver assistance systems need a lot of external information, in order to ensure the safety driving of the respective automobile, while the respective assistance system is in charge.

In order to monitor the behavior of an automobile ahead, the illumination signals of the run ahead automobile may be monitored, in order to detect a braking of the car as well as a lane change.

US 2015/0123781 A1 discloses a system for detection of braking of a vehicle. A detector may detect light emitted by the rear lights of a vehicle in front of the vehicle that includes the mentioned system. A device may acquire data from the detector and analyze the acquired data in order to detect an optical signal emitted by the rear lights of the vehicle in front. The optical signal may encode information indicative of a braking procedure being performed by the vehicle in front. The device may evaluate the detected optical signal in order to derive the information indicative of the braking procedure of the vehicle in front.

There may be a need for better monitoring of automobiles around the respective at least driver assisted automobile, which may provide at least one advantage over the current state of the art.

According to a first aspect of the invention there is provided a method for learning a vehicle behavior of a monitored vehicle. The method comprises detecting at least a part of a vehicle illumination of the monitored vehicle and monitoring the detected vehicle illumination. And if a light-pattern occurs in the detected vehicle illumination, wherein the light-pattern corresponds to a frequency, intensity and/or color dependent glowing of the vehicle illumination, the light-pattern starting with a flashing up of at least a part of the detected vehicle illumination and ending after a certain time without glowing of the respective part of the detected vehicle illumination, the method moreover comprises: monitoring the light-pattern; monitoring a vehicle movement of the monitored vehicle during the occurrence of the light-pattern; and comparing the monitored light-pattern with at least a known light-pattern from a light-pattern data entry stored in an light-pattern database. And if the comparison results into the monitored light-pattern being unknown, the method moreover comprises: storing the light-pattern and the vehicle movement together as a new light-pattern data entry into the light-pattern database.

Some or all steps of the method may be executed in an automated way by means for automatization such as computer means.

A vehicle according to the invention may be an automobile like for example a car, van, lorry/truck and bus for driving.

A pattern respectively a light-pattern according to the invention may be for example a steady increasing/decreasing light change. Another example for a pattern according to the invention may be a steady erratic light change. Thus, according to the invention, a pattern may comprise a repeatable light/refulgence/glow behavior of at least a part of the vehicle lightings/illumination. Such repeatable light behavior may be detected for example by evaluation of steady differentiable light changes. Another determination possibility of such a pattern, may be achieved by using a Fourier analysis, if for example, the change in the light is determined as a steady erratic change.

A light-pattern may also comprise a change in refulgence intensity or refulgence color of a vehicle illumination. This change may be or may not be repeating. For example a braking light-pattern may comprise a repeating intensity change of light/refulgence. But it may also or alternatively comprise a not repeating intensity change of light as well as a permanently constant intensity of light of the corresponding braking illumination of the vehicle.

Such a light-pattern begins with a flashing up of the monitored illumination and ends with the ending of refulgence of the monitored illumination for a certain time. Such a certain time may be at least 2.5 seconds, preferably at least 1 second. The refulgence that occurs on the monitored illumination in-between this time-range, is regarding as a light-pattern, and includes a timely behavior of the refulgence, like a frequency behavior of the light of the illumination, like blinking, a color changing of the light of the illumination, an intensity changing, like increasing refulgence or decreasing refulgence, and the like.

A detecting an illumination according to the invention may be a sensing of the visible area of the monitored vehicle, in order to detect its lightings/illumination. Such a sensing may also comprise a small area around the monitored vehicle, in order to ensure to detect, if for example lightings/illuminations are arranged on the roof of the respective monitored vehicle.

A monitoring of the detected illumination according to the invention may comprise a sensing of a vehicle. The sensing may be undertaken in a continuous way or at least almost continuous way. Thus, the sensing rate should be high enough to ensure a detection of a light-pattern if it occurs. Therefore, the sensing may be done by use of optical devices such as a video camera or even other light-detecting devices.

A light-pattern database according to the invention may be a vehicle internal and/or vehicle external database, which stores information about different kind of light-patterns. Moreover, even vehicle movements, vehicle types and the like may be stored therein. If the light-pattern database is a vehicle internal database, the stored information may be updated with a vehicle external light-pattern database, like on an external server or in a cloud.

A vehicle movement according to the invention may be movement of the vehicle during the occurrence of a light-pattern. Even more detailed information about this movement may be stored, recognized and updated. For example for a deceleration movement different kind of vehicle movements may be known. For example one such vehicle movement of a deceleration movement may be a continuous slow deceleration, like it occurs, if only a slight braking of the monitored vehicle occurs. Another such movement may be a harsh braking movement, like an emergency braking with full braking power of the monitored vehicle.

This aspect of the invention is based on the idea that it may be advantageous to not rely on already known light-patterns and their corresponding vehicle movements of a respective monitored vehicle, but to be able to check, if an actual recognized light-pattern and/or vehicle movement is still actual or if it needs to be newly achieved. This takes into account that together with an increasing number of different vehicle types from a lot of different automobile producers, the chances are high that different vehicles may have a lot of different light-patterns, which all correspond to a same vehicle movement. Also it is possible that similar light-patterns correspond to different kind of vehicle movements.

According to a further aspect of the invention there is provided a vehicle comprising: a detecting means, for detecting at least a part of a vehicle illumination of a monitored vehicle; a monitoring means, for monitoring the detected vehicle illumination of the monitored vehicle; a determining means, for determining, if a light pattern occurs in at least a part the detected vehicle illumination of the monitored vehicle; a monitoring means, for monitoring the light pattern of the detected vehicle illumination of the monitored vehicle; a comparison means, for comparing the detected light pattern with at least a known light pattern of a light pattern data entry stored in a light pattern database; a monitoring means, for monitoring a vehicle movement of the monitored vehicle; and a storing means, for storing the monitored light pattern and the monitored vehicle movement as a new light pattern data entry into the light pattern database.

And moreover, the vehicle is adapted for executing a method according to the invention.

This aspect of the invention is based on the idea that it may be advantageous to provide a vehicle, which does not need to rely on already known light-patterns and their corresponding vehicle movements of a respective monitored vehicle, but which is able to check, if an actual recognized light-pattern and/or vehicle movement is still actual or if it needs to be newly achieved. This takes into account that together with an increasing number of different vehicle types from a lot of different automobile producers, the chances are high that different vehicles may have a lot of different light-patterns, which all correspond to a same vehicle movement. Also it is possible that similar light-patterns correspond to different kind of vehicle movements.

According to a further aspect of the invention there is provided a computer program product comprising machine-readable instructions stored on machine-readable media, for a vehicle according to the invention, for executing a method according to the invention.

This aspect of the invention is based on the idea that it may be advantageous to provide an automatized way for executing a method according to the invention.

According to a further aspect of the invention there is provided a machine-readable media comprising a computer program product according to the invention.

This aspect of the invention is based on the idea that it may be advantageous to provide an efficient way for distributing and/or storing a method according to the invention for execution on respective devices, machines, systems and/or vehicles.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

According to a first embodiment of the invention, if the comparison results into the monitored light-pattern being already known, the method further comprises: further comparing, if the monitored vehicle movement of the monitored vehicle, corresponds to a known vehicle movement of the known light pattern, by using a respective light pattern data entry from the light pattern database. And if the monitored vehicle movement of the monitored vehicle does not correspond to the known vehicle movement of the known light pattern, the method moreover comprises storing the monitored vehicle movement as a part of the respective light pattern data entry into the illumination pattern database.

This embodiment of the invention is based on the idea that it may be advantageous to be able to learn new moving-behaviors corresponding to known or new-light-patterns, in order to ensure a safe automatic driving process.

According to a further embodiment of the invention the vehicle movement and respectively the known vehicle movement comprises a movement from a movement group, the movement group comprising: an acceleration-change movement; a velocity-change movement; a lane-change movement; and a direction-change movement.

The movement group may further comprise an alerting movement. The movement group may further comprise a warning movement. Such movement may for example be different kind of zigzag movement of the vehicle.

An alerting movement according to the invention may comprise an alarm moving of a monitored vehicle. This may occur during an emergency situation, where the use of emergency vehicles like police cars, fire department cars and/or medical cars is needed. Such a moving may be a very quick prioritized moving of such a vehicle. In such cases a special light-pattern may be used for showing such emergency moving.

A warning movement according to the invention may comprise a warning moving of a monitored vehicle. This may occur for example during a traffic jam situation, where an emergency vehicle is using such a movement, in order to show other vehicles that a warning situation has occurred. In such cases a special light-pattern may be used for showing such warning moving.

This embodiment of the invention is based on the idea that it may be advantageous to be able to achieve and/or to react on special light-patterns and special vehicle movements.

According to a further embodiment of the invention, the comparison results into the monitored light-pattern being unknown, or if the moving of the monitored vehicle does not correspond to the vehicle movement of the known light-pattern, the method moreover comprises: detecting a type of the monitored vehicle. And storing the type of the monitored vehicle as part of the respective light-pattern information into the light-pattern database.

A type of the monitored vehicle may even comprise a brand of the vehicle, a model-number and the like.

This embodiment of the invention is based on the idea that it may be advantageous to also store specials information about a vehicle in such a light-pattern database, as it is very likely, that different kind of types of vehicles may use different light-patterns for same and/or similar action types respectively moving-behaviors and the other way around.

According to a further embodiment of the invention, comparing the detected light-pattern with at least a known light-pattern information stored in the light-pattern database, is making use of the type of the vehicle.

This embodiment of the invention is based on the idea that it may be advantageous take into account the type of vehicle when deciding if a recognized light-pattern is an already known pattern or a new pattern.

According to a further embodiment of the invention, the method moreover comprises: monitoring a distance to the monitored vehicle. And monitoring the light pattern is making use of the monitored distance.

This embodiment of the invention is based on the idea that it may be advantageous to take the distance of the monitored vehicle into account, in order to be able to determine more precise light-patterns and/or vehicle movements.

According to a further embodiment of the invention, if a vehicle-to-vehicle communication is available between the monitored vehicle and the vehicle executing the method, the monitoring of the moving of the monitored vehicle is making use of the vehicle-to-vehicle communication.

Initially, until the vehicle-to-vehicle communication may not be trusted, the light-patterns and the vehicle movement, like acceleration, deceleration and the like, may be used for the plausibilisation/reliability of the vehicle-to-vehicle communication itself.

This embodiment of the invention is based on the idea that it may be advantageous to take into account an existing vehicle-to-vehicle communication, in order to be able to ensure better reliability-probabilities for the determined vehicle movements.

The idea behind this is, that a sensor, such as radar, monitoring the vehicle is used to monitor the vehicle movement, such as for example an acceleration/deceleration movement of the vehicle, along with a light sensor, which may be used to monitor the light-pattern of the vehicle, and this two means may be used for plausibilisation/reliability of the vehicle-to-vehicle communication. This works like a 2 out of 3 redundancy, also called a '2oo3' redundancy.

According to a further embodiment of the invention, if a vehicle to-vehicle-communication is available between the monitored vehicle and the vehicle executing the method, the vehicle-to-vehicle communication is used for plausibilisation of the monitored light-pattern and its corresponding monitored vehicle movement.

A plausibilisation according to the invention may be a reliability check or may define the grade of reliability of information achieved from the monitored vehicle.

This embodiment of the invention is based on the idea that it may be advantageous to take into account an existing vehicle-to-vehicle communication, in order to be able to ensure better reliability-probabilities for the achieved light-patterns and/or the vehicle-to-vehicle communication.

According to a further embodiment of the invention, the illumination of the monitored vehicle is an illumination of a light-type of a light type group. Therein, the light-type group comprises: a front illumination, a top illumination, a side illumination and a rear illumination.

This embodiment of the invention is based on the idea that it may be advantageous to provide a light-pattern detection for different kind of light-types of a vehicle, as the different light-types may correspond to different kind of vehicle movements.

According to a further embodiment of the invention, monitoring the light-pattern of the detected vehicle illumination is making use of the light-type.

This embodiment of the invention is based on the idea that it may be advantageous to refer on the different kind of light-types of a vehicle when monitoring light-patterns, as the different light-types may correspond to different kind of vehicle movements.

According to a further embodiment of the invention, if the comparison results into the monitored light-pattern being unknown, the method moreover comprises: storing the monitored light-pattern and the monitored vehicle movement as a new light-pattern data entry into a further light-pattern database located outside the vehicle executing the method. Or, if the comparison results into the monitored light-pattern being already known and the monitored vehicle movement of the monitored vehicle does not correspond to the respective known vehicle movement of the known light-pattern, the method moreover comprises: storing the monitored vehicle movement as part of the respective light-pattern data entry into the further light-pattern database.

This embodiment of the invention is based on the idea that it may be advantageous to make new learned information available to other vehicles.

According to a further embodiment of the invention, the method moreover comprises: using the respective light-pattern data entry for a safety-driving of an assisted-driving process of a vehicle executing the method.

An assisted-driving process according to the invention may comprise at least a driver-assistant system, like an 'automatic braking assistant', an 'automatic evasion assistant' and the like. Such a high-automated driving process may also comprise systems for 'high automated driving' of a vehicle as well as 'full autonomous driving' of a vehicle.

This embodiment of the invention is based on the idea that it may be advantageous to use light-pattern data entries achieved from vehicles, to predict vehicle movements, in order to ensure a safety-driving of an assisted-driving process of a vehicle, by being able to pre-condition such an assisted-driving process on predicted occurring situations.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The illustration in the drawing is schematically. It is noted that in different figures, similar or identical elements or features are provided with the same reference signs or with reference signs, which are different from the corresponding reference signs only within the first digit. In order to avoid unnecessary repetitions, elements or features, which have already been elucidated with respect to a previously described embodiment, are not elucidated again at a later position of the description.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
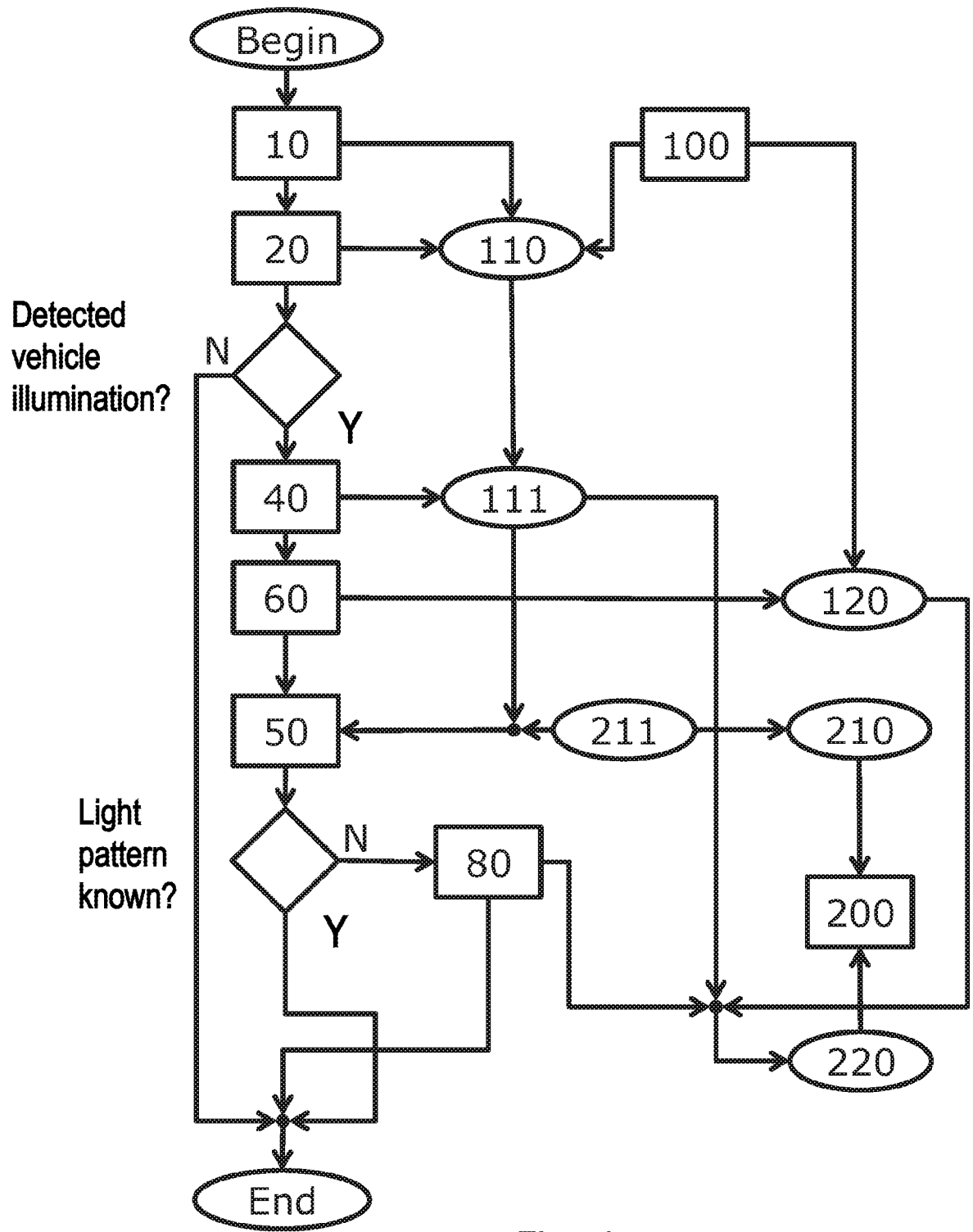
FIG. 1 is a schematical illustration of a proposed method according to an exemplary embodiment of the invention.

FIG. 1 shows a schematical illustration of a proposed method according to an exemplary embodiment of the invention.

Therein, FIG. 1 shows a method for learning a vehicle behavior of a monitored vehicle 100. The method comprises detecting 10 at least a part of a vehicle illumination 110 of the monitored vehicle 100 and monitoring 20 the detected 10 vehicle illumination 110. And, if a light-pattern 111 occurs in the detected 10 vehicle illumination 110, wherein the light-pattern 111 corresponds to a frequency, intensity and/or color dependent glowing of the vehicle illumination 110, the light-pattern 111 starting with a flashing up of at least a part of the detected 10 vehicle illumination 110 and ending after a certain time without glowing of the respective part of the detected 10 vehicle illumination 110, the method further comprises: monitoring 40 the light-pattern 111; monitoring 60 a vehicle movement 120 of the monitored vehicle 100 during the occurrence of the light-pattern 111; and comparing 50 the monitored 40 light-pattern 111 with at least a known light-pattern 211 from a light-pattern data entry 210 stored in an light-pattern database 200. And, if the comparison 50 results into the monitored 40 light-pattern 111 being unknown, the method further comprises: storing 80 the light-pattern 111 and the vehicle movement 120 together as a new light-pattern data entry 220 into the light-pattern database 200.

Figure 2:
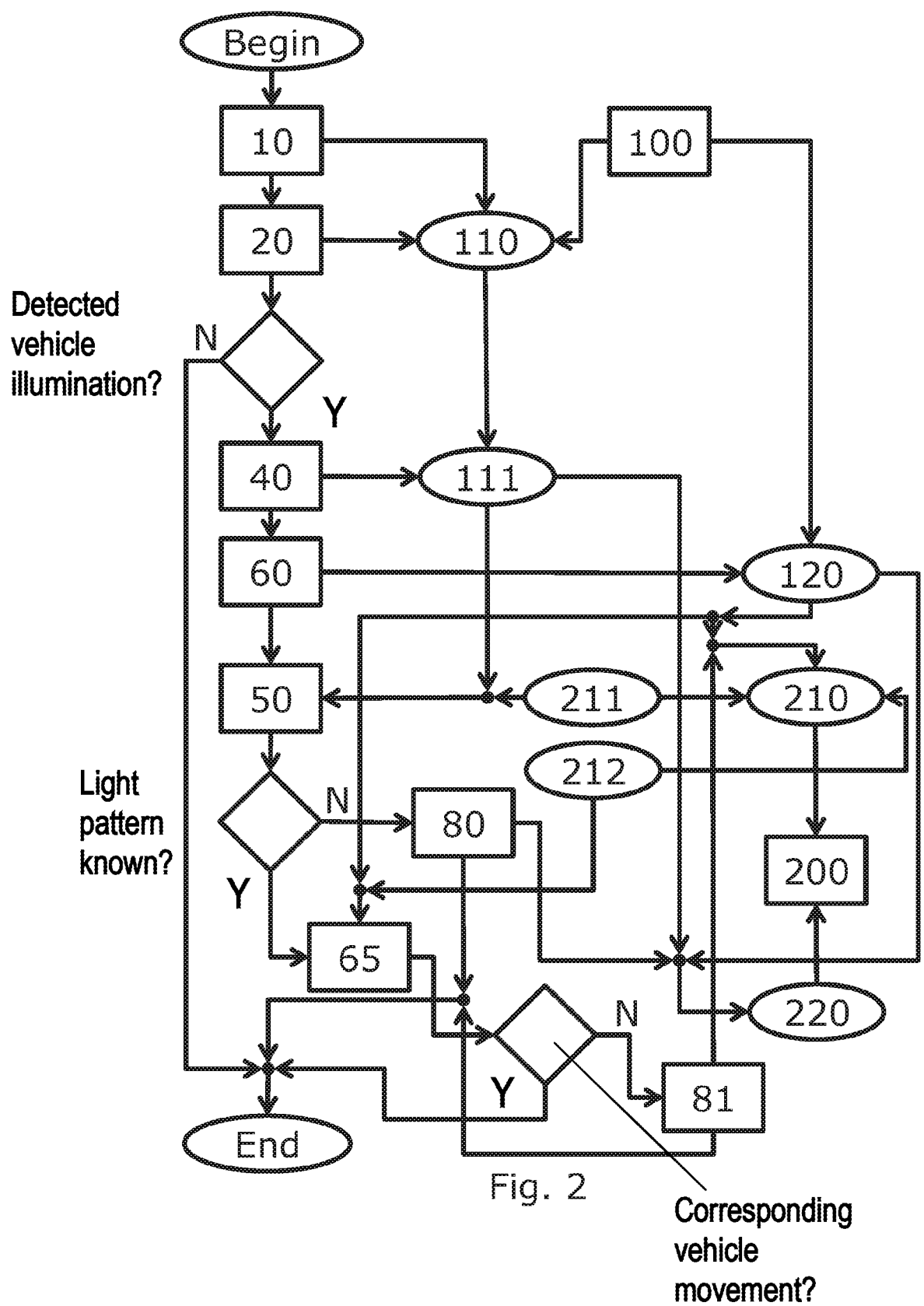
FIG. 2 is a schematical illustration of a proposed method according to a further exemplary embodiment of the invention.

FIG. 2 shows a schematical illustration of a proposed method according to a further exemplary embodiment of the invention.

FIG. 2 shows a further developed proposed method compared to the shown method in FIG. 1. Therefore, the herein before mentioned in FIG. 1 also applies to FIG. 2.

Therein, FIG. 2 shows the method of FIG. 1, wherein, if the comparison 50 results in the monitored 40 light-pattern 111 being already known, the method further comprises: further comparing 65, if the monitored 60 vehicle movement 120 of the monitored vehicle 100, corresponds to a known vehicle movement 212 of the known light-pattern 211, by using a respective light-pattern data entry 210 from the light-pattern database 200. And, if the monitored 60 vehicle movement 120 of the monitored vehicle 100 does not correspond to the known vehicle movement 212 of the known light-pattern 211, the method further comprises storing 81 the monitored 60 vehicle movement 120 as a part of the respective light-pattern data entry 210 into the light-pattern database 200.

Figure 3:
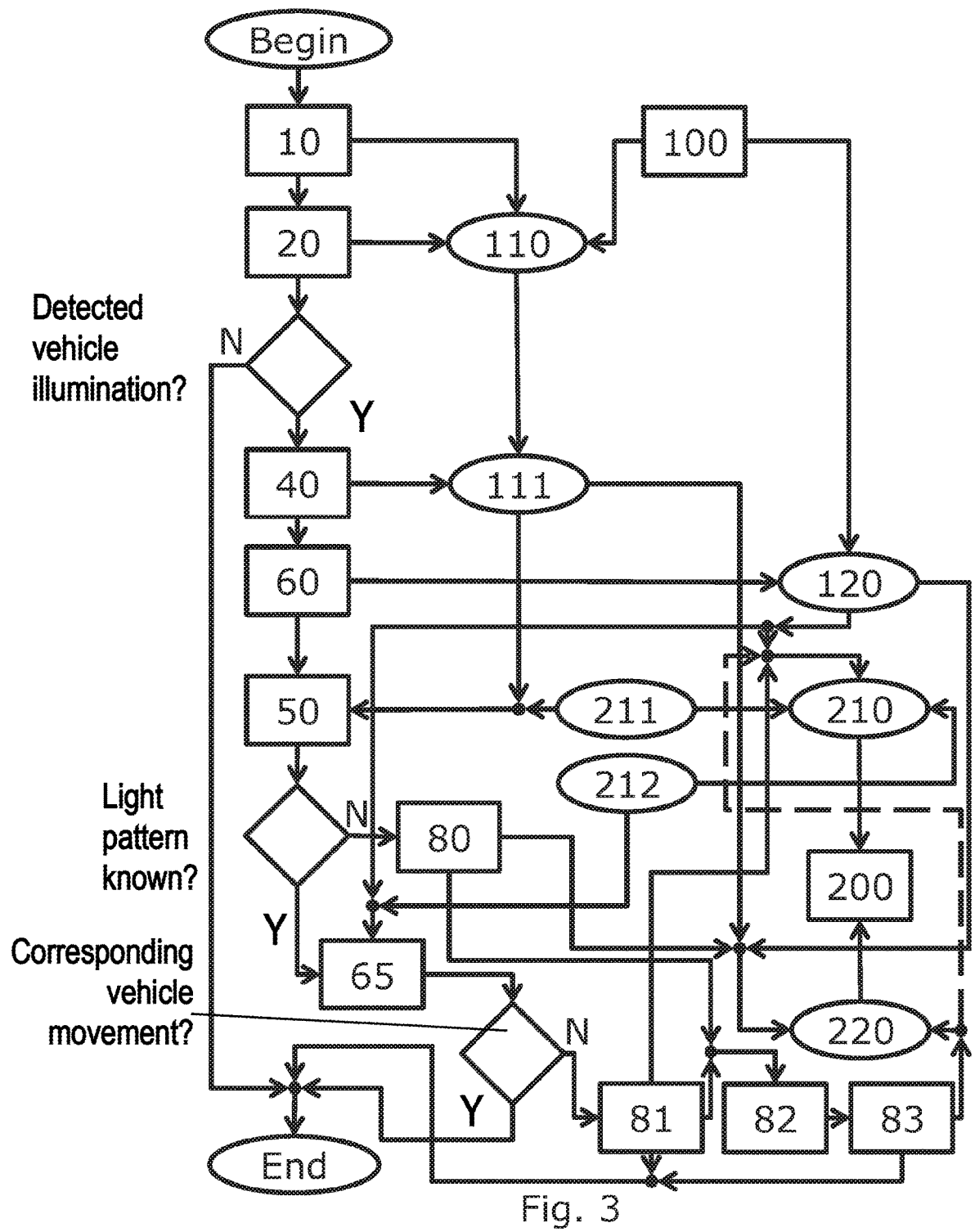
FIG. 3 is a schematical illustration of a proposed method according to a further exemplary embodiment of the invention.

FIG. 3 shows a schematical illustration of a proposed method according to a further exemplary embodiment of the invention.

FIG. 3 shows a further developed proposed method compared to the shown methods in FIG. 1 and FIG. 2.

Therefore, the herein before mentioned in FIG. 1 and FIG. 2 also applies to FIG. 3.

Therein, FIG. 3 shows the method of FIG. 2, wherein, if the comparison 50 results in the monitored 40 light-pattern 111 being unknown, or if the monitored 60 vehicle movement 120 of the monitored vehicle 100 does not correspond to the known vehicle movement 212 of the known light-pattern 211, the method further comprises: detecting 82 a vehicle-type of the monitored vehicle 100 and storing 83 the vehicle-type of the monitored vehicle 100 as part of the respective light-pattern data entry 210, 220 into the light-pattern database 200.

As this either concerns an entry into the known light-pattern data entry 210 or the new light-pattern data entry 220, the arrow representing the entry into the known light-pattern data entry 210 is marked dotted.

Figure 4:
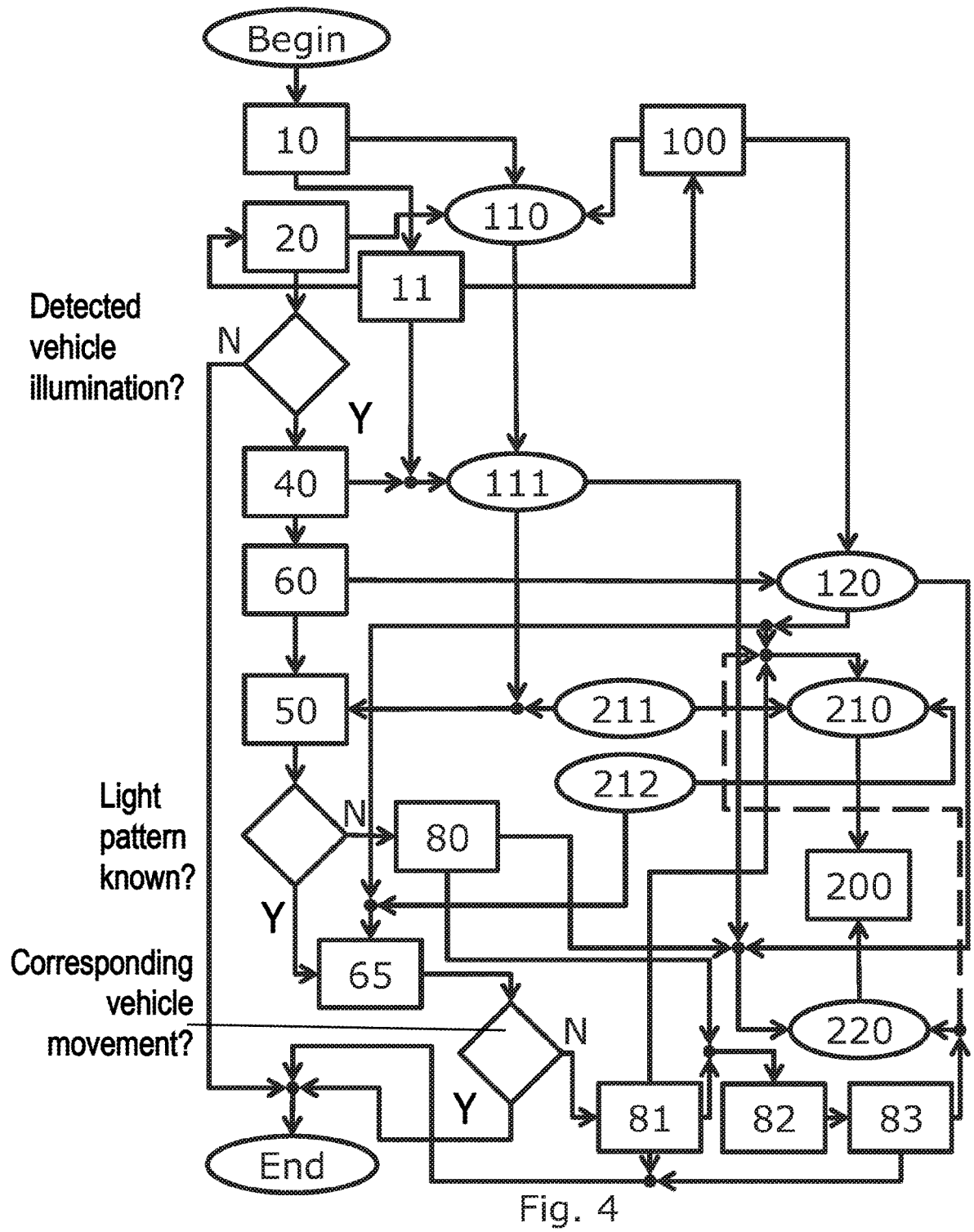
FIG. 4 is a schematical illustration of a proposed method according to a further exemplary embodiment of the invention.

FIG. 4 shows a schematical illustration of a proposed method according to a further exemplary embodiment of the invention.

FIG. 4 shows a further developed proposed method compared to the shown methods in FIG. 1 to FIG. 3.

Therefore, the herein before mentioned in FIG. 1 to FIG. 3 also applies to FIG. 4.

Therein, FIG. 4 shows the method of FIG. 3, wherein the method further comprises monitoring 11 a distance to the monitored vehicle 100 and wherein monitoring 40 the light-pattern 111 is making use of the monitored 11 distance.

Figure 5:
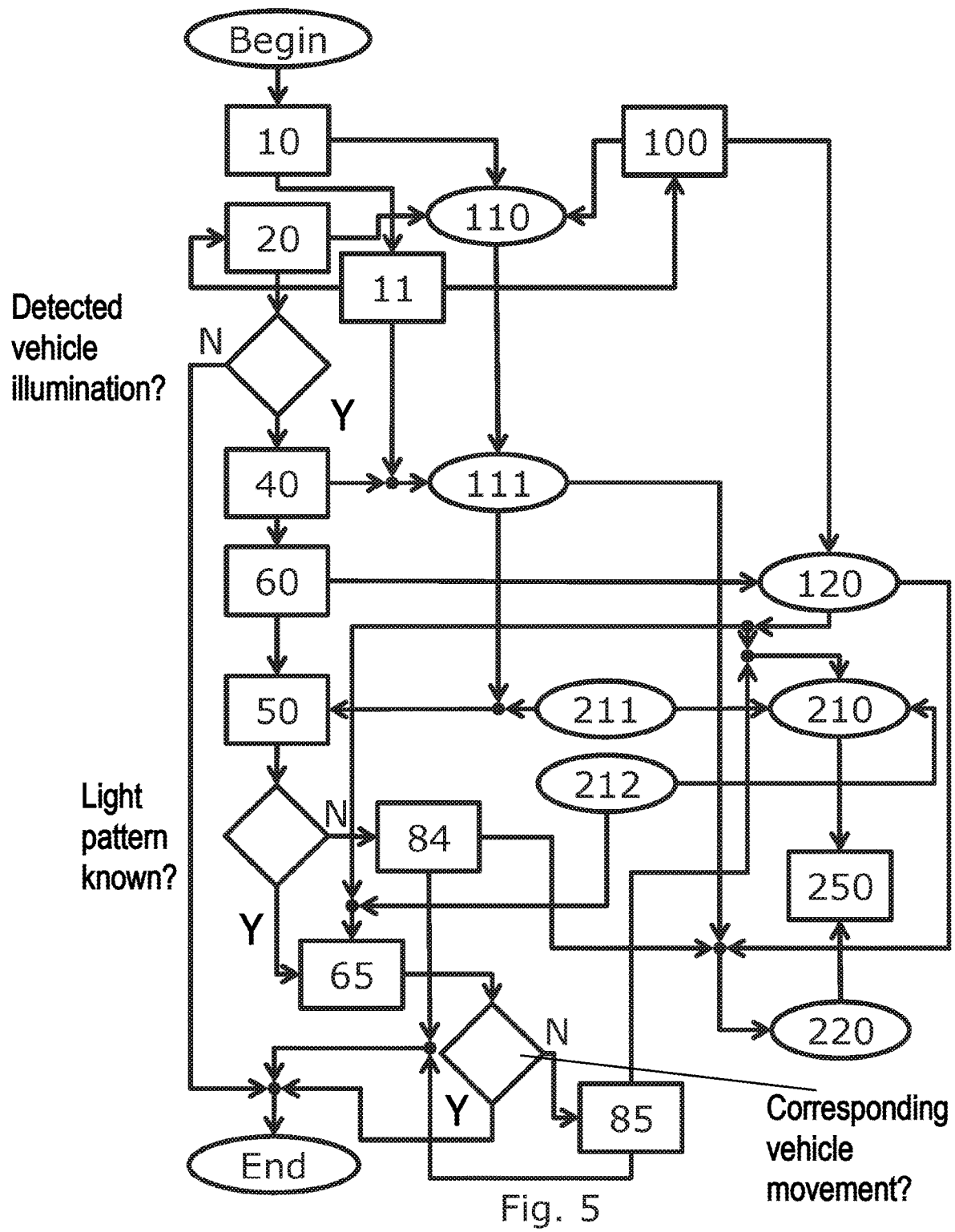
FIG. 5 is a schematical illustration of a proposed method according to a further exemplary embodiment of the invention.

FIG. 5 shows a schematical illustration of a proposed method according to a further exemplary embodiment of the invention.

FIG. 5 shows a further developed proposed method compared to the shown methods in FIG. 1 to FIG. 4.

Therefore, the herein before mentioned in FIG. 1 to FIG. 4 also applies to FIG. 5.

Therein, FIG. 5 shows the method of FIG. 2, wherein, if the comparison 50 results into the monitored 40 light-pattern 111 being unknown, the method further comprises: storing 84 the monitored 40 light-pattern 111 and the monitored 60 vehicle movement 120 as a new light-pattern data entry 210 into a further light-pattern database 250 located outside the vehicle 300 executing the method. Or, if the comparison 50 results into the monitored 40 light-pattern 111 being already known and the monitored 60 vehicle movement 120 of the monitored vehicle 100 does not correspond to the respective known vehicle movement 212 of the known light-pattern 211, the method further comprises: storing 85 the monitored 60 vehicle movement 120 as part of the respective light-pattern data entry 210 into the further light-pattern database 250.

In order to not crowd FIG. 5 with too many details, the method steps 80 and 81 of FIG. 2 are not shown anymore in FIG. 5.

Figure 6:
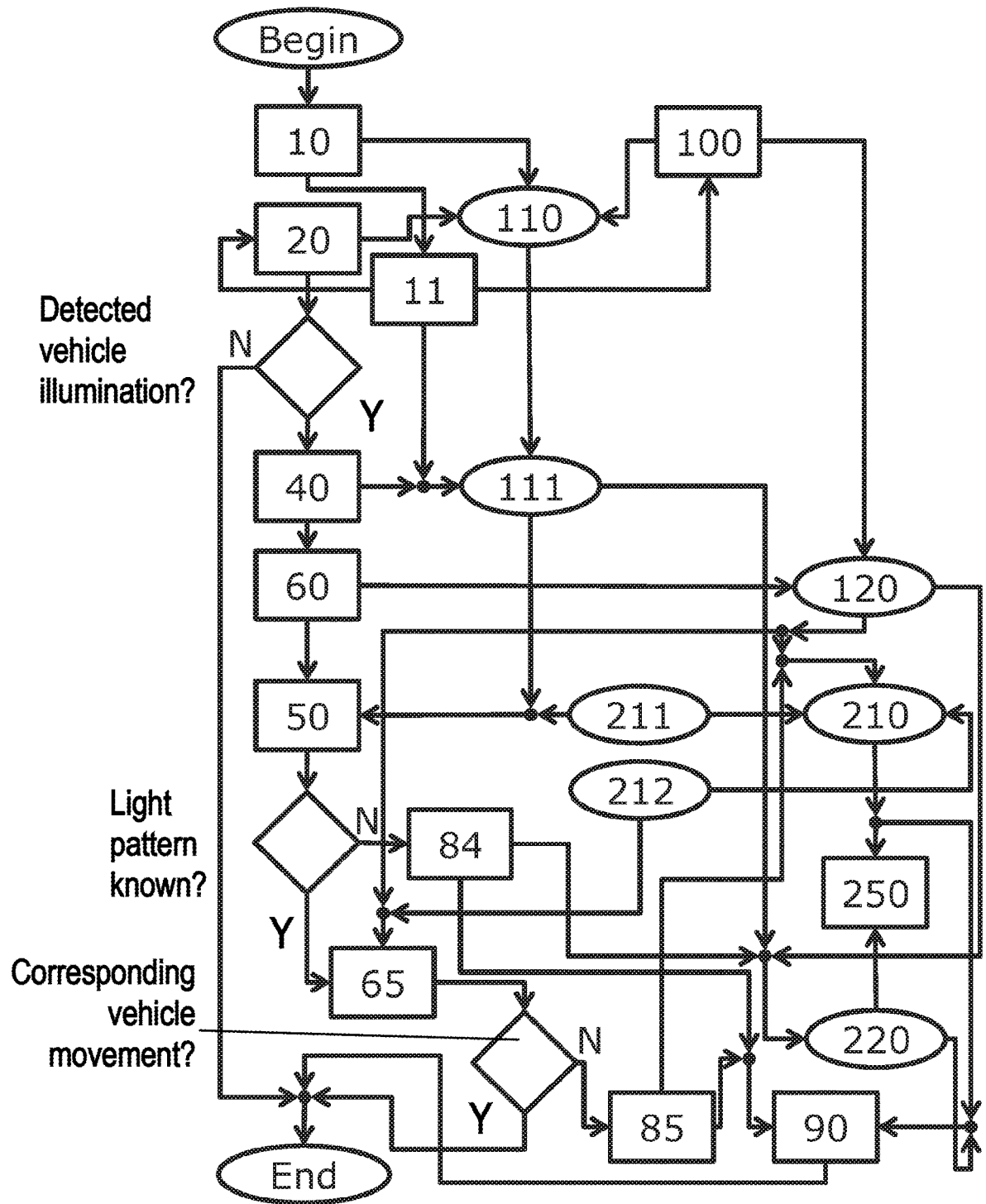
FIG. 6 is a schematical illustration of a proposed method according to a further exemplary embodiment of the invention.

FIG. 6 shows a schematical illustration of a proposed method according to a further exemplary embodiment of the invention.

FIG. 6 shows a further developed proposed method compared to the shown methods in FIG. 1 to FIG. 5.

Therefore, the herein before mentioned in FIG. 1 to FIG. 5 also applies to FIG. 6.

Therein, FIG. 6 shows the method of FIG. 5, wherein the method further comprises using 90 the respective light-pattern data entry 210, 220 for a safety-driving of an at least high-automated driving process of a vehicle 300 executing the method.

Figure 7:
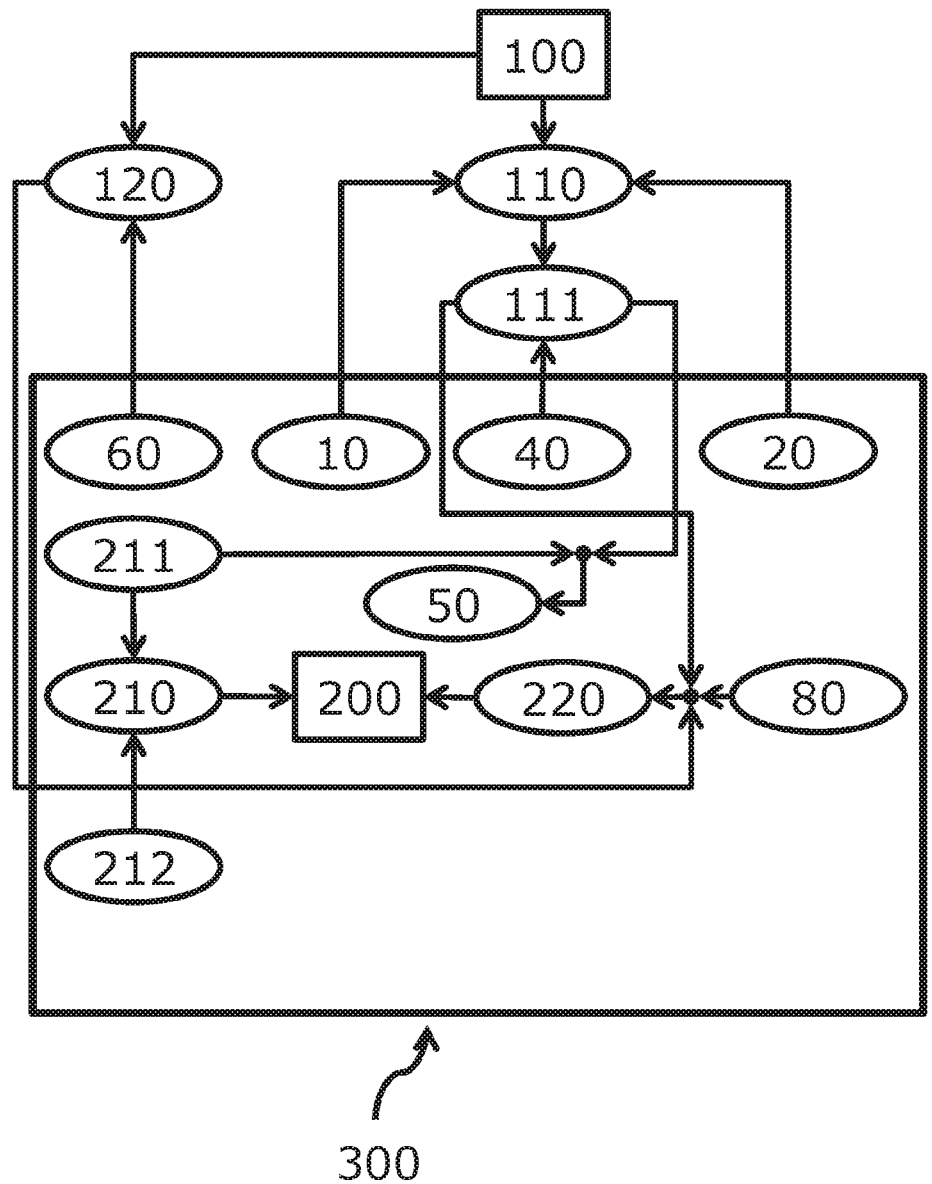
FIG. 7 is a schematical illustration of a proposed vehicle according to a further exemplary embodiment of the invention.

FIG. 7 shows a schematical illustration of a proposed automobile according to a further exemplary embodiment of the invention.

Therein, FIG. 7 shows a vehicle 300 comprising: a detector for detecting 10 at least a part of a vehicle illumination 110 of a monitored vehicle 100; a monitor for monitoring 20 the detected vehicle illumination 110 of the monitored vehicle 100; a determiner for determining if a light-pattern 111 occurs in at least a part the detected vehicle illumination 110 of the monitored vehicle 100; a monitor for monitoring 40 the light-pattern 111 of the detected vehicle illumination 110 of the monitored vehicle 100; a comparator for comparing 50 the detected light-pattern 111 with at least a known light-pattern 211 of a light-pattern data entry 210 stored in a light-pattern database 200, 250; a monitor for monitoring 60 a vehicle movement 120 of the monitored vehicle 100; and a storage for storing 80 the monitored 40 light-pattern 111 and the monitored 60 vehicle movement 120 as a new light-pattern data entry 220 into the light-pattern database 200, 250. And, the vehicle 300 is adapted for executing a method according to the invention.

In FIG. 5 the possible use of the external light-pattern database 250 is not illustrated for simplicity reasons.

It is noted that it may also be possible in further refinements of the invention to combine features from different illustrative embodiments described herein. It should also be noted that reference signs in the claims should not be construed as limiting the scope of the claims.

In order to recap the above described embodiments of the present invention, one can state the following.

The claimed invention allows for monitoring a vehicle, which is located somewhere around a vehicle that is moving during a driving-assisted driving process, a highly automated driving process or an autonomous driving process. Such processes are also named as "assisted-driving". The monitoring allows for determining different kind of light-patterns and vehicle movements, in order to ensure that the actual moving of the monitored vehicle is corresponding to a pre-stored vehicle movement. And if the moving of the monitored vehicle is not corresponding to a pre-stored vehicle movement, then this movement of the monitored vehicle may be achieved together with its corresponding light-pattern, in order to ensure a safe driving of the assisted-driving vehicle. Moreover it is possible to use a vehicle-to-vehicle communication to assure the movement of the monitored vehicle corresponds to the monitored one. With this it may be possible to still drive in a safe way, even if one of the two vehicles is hacked. For example, if the illumination of the monitored vehicle is hacked, then the vehicle-to-vehicle communication may inform about another illumination-behavior of the monitored vehicle, than the detected light-pattern shows. As another example, if the vehicle-to-vehicle communication and/or other systems of the assisted-driving vehicle are hacked, by relying on the recognized light signaling from the monitored vehicle, still a safe movement of the assisted-driving vehicle may be possible.

LIST OF REFERENCE SIGNS 10 detecting a vehicle illumination of the monitored vehicle
11 monitoring a distance to the monitored vehicle
20 monitoring the detected vehicle illumination
40 monitoring the light-pattern
50 comparing: the monitored light-pattern corresponds to at least a known light-pattern?
60 monitoring a vehicle movement
65 further comparing: the vehicle movement of the monitored vehicle corresponds to a vehicle movement of the known light-pattern?
80 storing the monitored light-pattern and the monitored vehicle movement as a new light-pattern data entry
81 storing the monitored vehicle movement
82 detecting a vehicle-type of the monitored vehicle
83 storing the vehicle-type of the monitored vehicle as part of the respective light-pattern data entry
84 storing the monitored light-pattern and the monitored vehicle movement as a new light-pattern data entry into a further light-pattern database
85 storing the monitored vehicle movement as part of the respective light-pattern data entry into the further light-pattern database
90 using the respective light-pattern information for a safety-driving
100 monitored vehicle
110 vehicle illumination
111 light-pattern
120 vehicle movement
200 light-pattern database
210 light-pattern data entry
211 known light-pattern
212 known vehicle movement
220 new light-pattern data entry
250 further light-pattern database
300 vehicle executing the method The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for learning a vehicle behavior of a monitored vehicle, the method executed by a vehicle and comprising the steps of:
   detecting a vehicle illumination of the monitored vehicle;
   monitoring the detected vehicle illumination using a first sensor; and
   if a light-pattern occurs in the detected vehicle illumination, wherein the light-pattern corresponds to a frequency, intensity and/or color dependent glowing of the vehicle illumination, the light-pattern starting with a flashing up of the detected vehicle illumination and ending after a certain time without glowing of the respective part of the detected vehicle illumination, the method further comprises the steps of:
      monitoring the light-pattern;
      monitoring a vehicle movement of the monitored vehicle during the occurrence of the light-pattern using a second sensor;
      comparing the monitored light-pattern with a known light-pattern from a light-pattern data entry stored in a light-pattern database, and
      if the comparison results in the monitored light-pattern being unknown, the method further comprises the step of:
         storing the light-pattern and the vehicle movement together as a new light-pattern data entry in the light-pattern database.

2. The method according to claim 1, further comprising the steps of:
   if the comparison results in the monitored light-pattern being already known:
      further comparing if the monitored vehicle movement of the monitored vehicle corresponds to a known vehicle movement of the known light-pattern by using a respective light-pattern data entry from the light-pattern database; and
   if the monitored vehicle movement of the monitored vehicle does not correspond to the known vehicle movement of the known light-pattern:
      storing the monitored vehicle movement as a part of the respective light-pattern data entry in the light-pattern database.

3. The method according to claim 2, wherein the vehicle movement and respectively the known vehicle movement comprises a movement from a movement group comprising:
   an acceleration-change movement,
   a velocity-change movement,
   a lane-change movement, and
   a direction-change movement.

4. The method according to claim 2, wherein
   if the comparison results in the monitored light-pattern being unknown, or
   if the monitored vehicle movement of the monitored vehicle does not correspond to the known vehicle movement of the known light-pattern, the method further comprises the steps of:
      detecting a vehicle-type of the monitored vehicle; and
      storing the vehicle-type of the monitored vehicle as part of the respective light-pattern data entry in the light-pattern database.

5. The method according to claim 4, wherein
   the comparing of the monitored light-pattern with at least the known light-pattern stored in the light-pattern database makes use of the detected vehicle-type.

6. The method according to claim 1, further comprising the steps of:
   monitoring a distance to the monitored vehicle; and
   monitoring the light-pattern by making use of the monitored distance.

7. The method according to claim 1, wherein
   if a vehicle-to-vehicle communication is available between the monitored vehicle and the vehicle executing the method,
      the monitoring of the vehicle movement of the monitored vehicle makes use of the vehicle-to-vehicle communication.

8. The method according to claim 1, wherein
   if a vehicle-to-vehicle communication is available between the monitored vehicle and the vehicle executing the method, the vehicle-to-vehicle communication is used for plausibilisation of the monitored light-pattern and its corresponding monitored vehicle movement.

9. The method according to claim 1, wherein
   the vehicle illumination of the monitored vehicle is an illumination of a light-type of a light-type group, wherein the light-type group comprises:
      a front illumination of a vehicle,
      a top illumination of a vehicle,
      a side illumination of a vehicle, and
      a rear illumination of a vehicle.

10. The method according to claim 9, wherein monitoring the light-pattern of the detected vehicle illumination makes use of the light-type.

11. The method according to claim 1, wherein
   the new light-pattern data entry is a first new light-pattern data entry;
   if the comparison results in the monitored light-pattern being unknown, the method further comprises the step of:
      storing the monitored light-pattern and the monitored vehicle movement as a second new light-pattern data entry in a further light-pattern database located outside the vehicle executing the method, or
   if the comparison results in the monitored light-pattern being already known and the monitored vehicle movement of the monitored vehicle does not correspond to the respective known vehicle movement of the known light-pattern, the method further comprises the step of:
      storing the monitored vehicle movement as part of the respective light-pattern data entry in the further light-pattern database.

12. The method according to claim 1, further comprising the step of:
   using the respective light-pattern data entry for a safety-driving of an at least high-automated driving process of the vehicle executing the method.

13. A vehicle comprising:
   a light detector for detecting vehicle illumination of a monitored vehicle;
   a first sensor for monitoring the detected vehicle illumination of the monitored vehicle;
   a processor configured to:
      determine if a light-pattern occurs in the detected vehicle illumination of the monitored vehicle; and
      compare the detected light-pattern with a known light-pattern of a light-pattern data entry stored in a light-pattern database;
   a second sensor for monitoring the light-pattern of the detected vehicle illumination of the monitored vehicle;
   a third sensor for monitoring a vehicle movement of the monitored vehicle; and
   a computer readable storage for storing the monitored light-pattern and the monitored vehicle movement as a new light-pattern data entry in the light-pattern database, wherein the vehicle, using the processor, is configured to carry out the steps of:
      detecting the vehicle illumination of the monitored vehicle;
      monitoring the detected vehicle illumination; and
      if the light-pattern occurs in the detected vehicle illumination, wherein the light-pattern corresponds to a frequency, intensity and/or color dependent glowing of the vehicle illumination, the light-pattern starting with a flashing up of the detected vehicle illumination and ending after a certain time without glowing of the respective part of the detected vehicle illumination:
         monitoring the light-pattern;
         monitoring the vehicle movement of the monitored vehicle during the occurrence of the light-pattern;
         comparing the monitored light-pattern with the known light-pattern from the light-pattern data entry stored in the light-pattern database, and
         if the comparison results in the monitored light-pattern being unknown:
            storing the light-pattern and the vehicle movement together as the new light-pattern data entry in the light-pattern database.

14. The vehicle according to claim 13, wherein
the new light-pattern data entry is a first new light-pattern data entry;
if the comparison results in the monitored light-pattern being unknown, the vehicle, using the processor, is further configured to carry out the steps of:
storing the monitored light-pattern and the monitored vehicle movement as a second new light-pattern data entry in a further light-pattern database located outside the vehicle, or
if the comparison results in the monitored light-pattern being already known and the monitored vehicle movement of the monitored vehicle does not correspond to the respective known vehicle movement of the known light-pattern, the vehicle, using the processor, is further configured to carry out the steps of:
storing the monitored vehicle movement as part of the respective light-pattern data entry in the further light-pattern database.

15. A computer program product comprising a non-transitory computer readable medium having stored thereon machine readable instructions that, when executed by a processor, carries out the steps of:
detecting a vehicle illumination of a monitored vehicle;
monitoring the detected vehicle illumination using a first sensor; and
if a light-pattern occurs in the detected vehicle illumination, wherein the light-pattern corresponds to a frequency, intensity and/or color dependent glowing of the vehicle illumination, the light-pattern starting with a flashing up of the detected vehicle illumination and ending after a certain time without glowing of the respective part of the detected vehicle illumination, then carrying out:
monitoring the light-pattern;
monitoring a vehicle movement of the monitored vehicle during the occurrence of the light-pattern using a second sensor;
comparing the monitored light-pattern with a known light-pattern from a light-pattern data entry stored in a light-pattern database, and
if the comparison results in the monitored light-pattern being unknown, then carrying out:
storing the light-pattern and the vehicle movement together as a new light-pattern data entry in the light-pattern database.

16. The computer program product according to claim 15, wherein
the new light-pattern data entry is a first new light-pattern data entry;
if the comparison results in the monitored light-pattern being unknown, the computer program product further comprises machine readable instructions that, when executed by the processor, carries out the steps of:
storing the monitored light-pattern and the monitored vehicle movement as a second new light-pattern data entry in a further light-pattern database located outside a vehicle in which the computer program product is disposed, or
if the comparison results in the monitored light-pattern being already known and the monitored vehicle movement of the monitored vehicle does not correspond to the respective known vehicle movement of the known light-pattern, the computer program product further comprises machine readable instructions that, when executed by the processor, carries out the steps of:
storing the monitored vehicle movement as part of the respective light-pattern data entry in the further light-pattern database.

* * * * *